United States Patent
Mainguet et al.

(10) Patent No.: US 10,810,406 B2
(45) Date of Patent: Oct. 20, 2020

(54) METHOD FOR RECOGNISING A FALSE PAPILLARY PRINT BY STRUCTURED LIGHTING

(71) Applicants: COMMISSARIAT A L'ENERGIE ATOMIQUE ET AUX ENERGIES ALTERNATIVES, Paris (FR); Idemia Identity & Security France, Issy les Moulineaux (FR)

(72) Inventors: Jean-François Mainguet, Grenoble (FR); Jérôme Boutet, Claix (FR); Joël Yann Fourre, Marly le Roi (FR)

(73) Assignees: COMMISSARIAT A L'ENERGIE ATOMIQUE ET AUX ENERGIES ALTERNATIVES, Paris (FR); IDEMIA IDENTITY & SCIENCE FRANCE, Issy les Moulineaux (FR)

( * ) Notice: Subject to any disclaimer, the term of this patent is extended or adjusted under 35 U.S.C. 154(b) by 0 days.

(21) Appl. No.: 16/064,620

(22) PCT Filed: Dec. 21, 2016

(86) PCT No.: PCT/EP2016/082066
§ 371 (c)(1),
(2) Date: Jun. 21, 2018

(87) PCT Pub. No.: WO2017/108883
PCT Pub. Date: Jun. 29, 2017

(65) Prior Publication Data
US 2019/0012513 A1   Jan. 10, 2019

(30) Foreign Application Priority Data
Dec. 23, 2015   (FR) ...................................... 15 63180

(51) Int. Cl.
*G06K 9/20* (2006.01)
*G06K 9/00* (2006.01)
*G06F 21/32* (2013.01)

(52) U.S. Cl.
CPC ............ *G06K 9/0012* (2013.01); *G06F 21/32* (2013.01); *G06K 9/0004* (2013.01); *G06K 9/00906* (2013.01); *G06K 9/2027* (2013.01)

(58) Field of Classification Search
CPC combination set(s) only.
See application file for complete search history.

(56) References Cited

U.S. PATENT DOCUMENTS 10,176,357 B2 *   1/2019   Mainguet ............. G06K 9/0002
10,178,284 B2 *   1/2019   Verilhac ............... H04N 5/2253
(Continued)

FOREIGN PATENT DOCUMENTS

WO   2008/050070 A2   5/2008
WO   WO-2008050070 A2 *   5/2008   ........... G06K 9/2018
(Continued)

OTHER PUBLICATIONS

International Search Report for International Application No. PCT/EP2016/082066 dated Feb. 17, 2017.
(Continued)

*Primary Examiner* — Tsung Yin Tsai
(74) *Attorney, Agent, or Firm* — Pearne & Gordon LLP (57) ABSTRACT

A method for determining if a papillary print is comprised of living human tissue or not, using a papillary print sensor comprising in superposition, a contact surface, an array optical sensor, and a plurality of illuminating devices parallel between them. The method comprises illumination of the papillary print by the illuminating devices forming together, on the contact surface, a light pattern which is uniform along an axis that extends from one side to the other (Continued)

of a detecting surface of the array optical sensor, and acquisition of an image by the array optical sensor, with these steps being implemented at least once; in each image, selection of the pixels corresponding to the valleys or ridges of the print; and using the pixels selected, extraction of an optical characteristic defining the response to illumination, of the material comprising the papillary print.

14 Claims, 5 Drawing Sheets

(56) References Cited

U.S. PATENT DOCUMENTS

| | | | |
|---|---|---|---|
| 10,380,400 B2 * | 8/2019 | Mainguet | G06K 9/0004 |
| 2001/0056237 A1 * | 12/2001 | Cane | A61B 5/0059 |
| | | | 600/475 |
| 2010/0049180 A1 * | 2/2010 | Wells | A61N 5/0616 |
| | | | 606/12 |
| 2012/0078160 A1 * | 3/2012 | McMillan | A61N 5/0603 |
| | | | 604/20 |
| 2013/0051637 A1 * | 2/2013 | Kulcke | G06K 9/0012 |
| | | | 382/124 |
| 2015/0191309 A1 | 7/2015 | Mainguet et al. | |
| 2017/0010200 A1 | 1/2017 | Boutet et al. | |
| 2018/0032781 A1 | 2/2018 | Mainguet et al. | |
| 2018/0032782 A1 | 2/2018 | Mainguet et al. | |

FOREIGN PATENT DOCUMENTS

| | | | | |
|---|---|---|---|---|
| WO | 2008/111994 A1 | 9/2008 | | |
| WO | WO-2008111994 A1 * | 9/2008 | ........... | G06K 9/0012 |

OTHER PUBLICATIONS

Written Opinion for International Application No. PCT/EP2016/082066 dated Feb. 17, 2017.

Preliminary French Search Report issued in Patent Application No. FR 15 63180 dated Sep. 29, 2016.

Bozhao Tan et al., "Spoofing protection for fingerprint scanner by fusing ridge signal and valley noise", Pattern Recognition, vol. 43, No. 8, Aug. 1, 2010, pp. 2845-2857.

Javier Galbally et al., "A high performance fingerprint liveness detection method based on quality related features", Future Generations Computer Systems, Elsevier Science Publishers, vol. 28, No. 1, 2012, pp. 311-321.

Shoude Chang et al., "Fingerprint spoof detection using near infrared optical analysis", State in the art in Biometrics, Jul. 27, 2011, pp. 57-84.

Cuccia et al., "Quantitation and mapping of tissue optical properties using modulated imaging", Journal of Biomedical Optics 14(2), 024012 (Mar./Apr. 2009).

U.S. Appl. No. 15/900,505; entitled "Print Sensor with Gallium Nitride LED," filed Feb. 20, 2018.

U.S. Appl. No. 15/922,204; entitled "Optical Imaging Device," filed Mar. 15, 2018.

* cited by examiner

METHOD FOR RECOGNISING A FALSE PAPILLARY PRINT BY STRUCTURED LIGHTING

CROSS-REFERENCE TO RELATED APPLICATIONS

This is a National Stage application of PCT international application PCT/EP2016/082066, filed on Dec. 21, 2016 which claims the priority of French Patent Application No. 1563180, filed Dec. 23, 2015, both of which are incorporated herein by reference in their entirety.

TECHNICAL FIELD

The invention relates to the field of papillary print sensors. It more particularly relates to a method for detecting fraud.

A papillary print designates a print linked to the particular folds of the skin, in particular a fingerprint, but also a palm, foot or phalange print.

Such a print forms an effective means for identifying a person. This means of identification can be supplemented with a detection of fraud, so as to detect when a genuine papillary print is replaced with an imitation. In other terms, it entails recognising if a papillary print is a true print, comprised of living human tissue, or a false print, which is not comprised of living human tissue (for example latex, rubber, or gelatine).

PRIOR ART

Various methods are known in prior art for recognising a false papillary print, making use of the specific optical properties of a living human tissue, in particular its spectral response. Patent application WO 2008/050070 describes an example of such a method.

A disadvantage of this method is in particular that it offers a characterisation only in small very and particular locations on the print. These locations can be known by the fraudster. By covering his finger with an imitation of a fingerprint, except in these small locations, he can deceive the fraud detection.

An objective of this invention is to propose a method and a device making it possible to overcome this disadvantage of prior art.

DISCLOSURE OF THE INVENTION

This objective is achieved with a method for determining whether or not a papillary print is comprised of living human tissue, the print being in direct physical contact with a contact surface of a papillary print sensor comprising, in superposition under the contact surface, an array (or matrix) optical sensor, and illuminating means formed by a plurality of illuminating devices parallel between them.

The method according to the invention comprises the following steps:
- illumination of the papillary print by the illuminating means, the illuminating devices forming together, on the contact surface, at least one light pattern which is uniform along an axis that extends from one side to the other of a detecting surface of the array optical sensor, and acquisition of an image by the array optical sensor, with these steps being implemented at least once;
- in each image acquired, selection of the pixels corresponding to the valleys of the print, or selection of the pixels corresponding to the ridges of the print; and using the pixels selected, extraction of an optical characteristic defining the response to at least one illumination, of the material comprising the papillary print, and use of this optical characteristic in order to determine the values of at least two characteristic optical coefficients of the print.

This method does not require the emission of an additional light signal, other than the one which is useful for imaging the papillary print.

The characterisation of the papillary print implements an illumination referred to as structured, i.e. corresponding to the lighting of certain illuminating devices only. Using this illumination, the papillary print can be characterised in order to deduce whether or not it is comprised of living human tissue. This characterisation does not impose the use of several illumination wavelengths.

Each photodetector of the array optical sensor can contribute to detecting fraud, which offers an excellent resolution for the detection of fraud without increasing the size of a device required to implement the method.

The detection of fraud implemented as such can therefore characterise the entire surface of the print in direct physical contact with the contact surface of the array optical sensor.

The method according to the invention therefore offers a consolidated detection of fraud, in comparison with the methods of prior art.

Preferably, each light pattern is uniform along the axis of the width of the detecting surface of the array optical sensor.

Advantageously, the at least two characteristic optical coefficients of the print include an absorption coefficient $\mu_A$ and a reduced scattering coefficient $\mu_S'$.

$\mu_A$ is expressed in mm-1 or cm$^{-1}$, and corresponds to an optical intensity absorbed per unit of length, in a material.

$\mu_S'$ is expressed in mm-1 or cm$^{-1}$, and corresponds to an optical intensity scattered per unit of length in the material $\mu_S'=(1-g)^*\mu_S$, g being the anisotropy coefficient.

The method according to the invention can further comprise a step of comparison between said values and reference data, in order to distinguish values associated with a papillary print comprised of living human tissue, and values associated with a papillary print which is not comprised of living human tissue.

Each light pattern extends advantageously above the detecting surface of the array optical sensor, and is comprised of one or several lighting strip(s) parallel to lines of pixels of the array optical sensor.

Preferably, the illumination of the papillary print can be implemented using illuminating means arranged above the array optical sensor, and such that each illuminating device is comprised of an organic light-emitting diode.

The values of the characteristic optical coefficients of the papillary print, in particular the absorption coefficient $\mu_A$ and the reduced scattering coefficient $\mu_S'$, are advantageously determined using a predictive model of the response of a print to a known illumination function, with this model being a function of said characteristic optical coefficients, by minimising a difference between this model and an experimental measurement of the response of the papillary print to this same illumination, obtained using the selected pixels.

Alternatively, the values of the characteristic optical coefficients of the papillary print, in particular the absorption coefficient $\mu_A$ and the reduced scattering coefficient $\mu_S'$, can be determined using a set of characteristic curves of the response of a print to a known illumination function, each curve being associated with known values of said characteristic optical coefficients, by seeking which curve is the closest to a corresponding experimental curve obtained using the selected pixels.

The predictive model, or the set of characteristic curves, can be obtained by a calculation of the convolution of an illumination function associated with the at least one light pattern, with the pulse response of a medium of which the values of said characteristic optical coefficients are known.

Preferably, at each step of illumination of the papillary print, the illuminating means together form at least one light pattern defined by a periodical illumination function along the axis of the length of the detecting surface of the array optical sensor.

It is understood, without it being necessary to specify it, that the light pattern formed by the illuminating means is different at each step of illumination. As such, different information can be obtained at each one of the steps of illumination.

The illuminating means can together form a light pattern defined by a spatially periodic illumination function of the slot type.

Alternatively, at each step of illumination, the illuminating means together form light patterns that together define a periodic function of the sine type.

The steps of illumination of the papillary print and acquisition of an image can be implemented at least three times, for the same frequency of the illumination function of the sine type, and for three different phase shifts of said function.

According to another alternative, at each step of illumination, the illuminating means together form a light pattern defined by an illumination function of the edge type.

According to another alternative, at each step of illumination, the illuminating means together form a light pattern defined by an illumination function of the thin line type.

A series of images can be acquired, associated with different positions of the lit illuminating device or devices forming together a light pattern defined by an illumination function of the thin line or edge type.

Preferably, at each step of illumination, the illuminating devices are lit and extinguished in order to successively form different light patterns, a scanning frequency from one light pattern to the next being synchronised with a scanning frequency of the integration of the lines of pixels of the array optical sensor.

Said synchronisation can be implemented in order to carry out an illumination of the papillary print by an illumination function of the sine type, and the values of said characteristic coefficients of the print are determined using two images acquired by the array optical sensor, and associated with two separate phase values of said illumination function.

Alternatively, said synchronisation is implemented in order to acquire images in which each line of pixels is associated with a same distance to a particular point of the light patterns.

The invention also relates to a system for implementing a method according to the invention, comprising:
  a papillary print sensor comprising, in superposition, a contact surface to which the print to be imaged is intended to be applied, an array optical sensor, and illuminating means formed by a plurality of illuminating devices parallel between them;
  means for controlling, configured to light and extinguish the illuminating devices according to at least one step of illumination of the papillary print;
  means for selecting pixels, configured to receive the at least one image acquired by the array optical sensor, and to extract therefrom the pixels corresponding to the valleys of the print, or the pixels corresponding to the ridges of the print; and
  means for determining values of the characteristic optical coefficients, using the pixels selected.

BRIEF DESCRIPTION OF THE DRAWINGS

This invention shall be better understood when reading the description of embodiments given solely for the purposes of information and in no way limiting, in reference to the accompanying drawings wherein.

DETAILED DESCRIPTION OF PARTICULAR EMBODIMENTS

FIGS. 1A to 1D diagrammatically show a method according to the invention as well as a system 100 specially adapted to implementing this method.

Figure 1A:
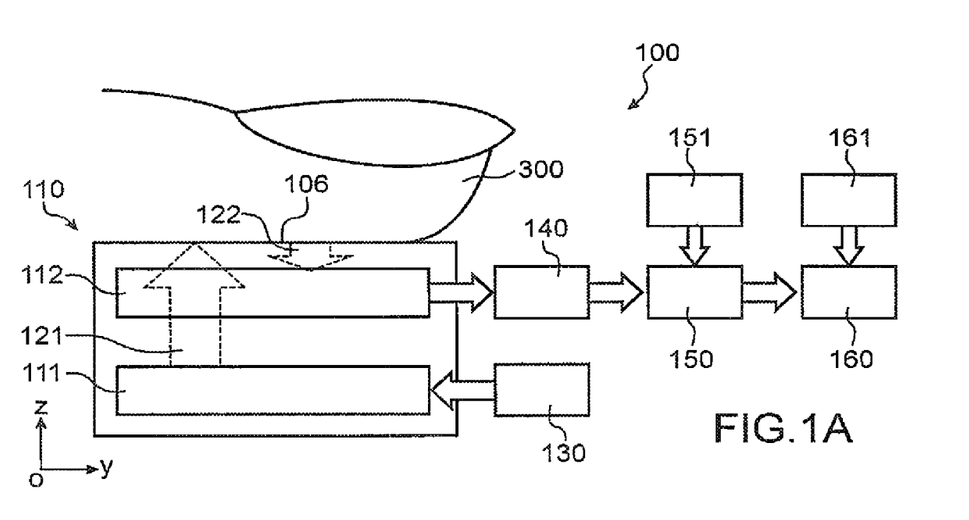
FIG. 1A diagrammatically shows a system that is specially adapted to implementing a first embodiment of the method according to the invention.

In order to facilitate the understanding of the invention, we shall begin by describing the system 100, to distinguish a true papillary print from an imitation.

In what follows, it shall be considered, by way of example and in a non-limiting way, that this is a fingerprint.

The system 100 comprises a fingerprint sensor 110 comprised of:
  a contact surface 106, whereon, in use, the user places his finger 300 in such a way that the skin, in other terms the tissues, or at least the skin of the ridges of the papillary print, are in direct physical contact with said surface 106;
  an array optical sensor 112 formed from a plurality of photodetectors, for example PiN diodes (for "P-Type Intrinsic N-Type"), from organic photodetectors (referred to as OPD), from phototransistors, or any other photosensitive element; and
  illuminating means 111.

The array optical sensor 112 and the illuminating means 111 are in superposition, under the contact surface 106.

Where applicable, the element among the illuminating means 111 and the array optical sensor 112 which is located above the other allows a sufficient quantity of light to pass in order to carry out the imaging function. This corresponds for example to a transmission coefficient of at least 10% at the central emission wavelength of the illuminating means.

The array optical sensor comprises photodetectors distributed into lines and columns, for example according to a square mesh. The extent of the lines defines the width L1 of the detecting surface 125 of the array optical sensor. The extent of the columns defines the length L2 of the detecting surface 125 of the array optical sensor.

The width L1 is aligned with the axis (OY). The length L2 is aligned with the axis (OX). The largest side of the array optical sensor can be indifferently the length or the width. The detecting surface is the surface over which extends the photodetectors, parallel to the plane (XOY).

The illuminating means 111 are configured to emit a light signal 121 in the direction of a fingerprint located on the finger 300 (which is in direct physical contact with the array optical sensor, on the contact surface 106).

This signal is backscattered by the finger and returns to the fingerprint sensor 110 in the form of a backscattered signal 122, received by the array optical sensor 112.

The illuminating means 111 are comprised of a plurality of illuminating devices 1110. The fingerprint sensor 110 comprises for example more than ten illuminating devices 1110, preferably several tens.

Each illuminating device 1110 extends uninterruptedly over more than a third of the width L1 of said detecting surface.

Furthermore, they extend together according to one or two series of forms that are parallel to one another, distributed along the length L2 of the detecting surface.

The illuminating devices 1110 are therefore coplanar, distributed here over a surface with dimensions greater than or equal to those of the detecting surface 125 of the array optical sensor. As such, a papillary print can be illuminated from locations distributed everywhere on this surface.

Figure 1B:
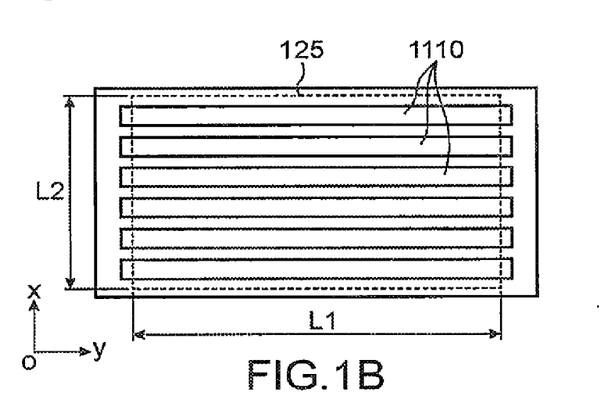
FIGS. 1B and 1C diagrammatically show two alternatives of illuminating means according to the invention.

In FIG. 1B, the illuminating devices 1110 extend together according to a single series of forms parallel between them.

They each extend substantially over the entire width L1 of the detecting surface 125 of the array optical sensor, for example at least 90% of this width.

In FIG. 1B, they extend even beyond this detecting surface, which limits the edge effects on the images acquired. In other terms, they extend below (or above) said detecting surface, by extending on either side from the latter in a plane (XOY).

Here, the illuminating devices all have the same extent along the axis (OY). Preferably, they also have the same dimensions along (OX) and (OZ).

They extend according to forms that are parallel between them, here according to strips parallel between them.

Alternatively, each pattern has the shape of a trapeze, or as a zigzag in particular sinusoidal, or any other elongated shape along (OY). In all of these alternatives, the illuminating devices supply lighting, or illumination, in parallel strips.

The forms of the illuminating devices extend here parallel to one another and parallel to the axis (OY), i.e. parallel to the lines of pixels of the array optical sensor.

Alternatively, these forms can extend parallel between them and slightly inclined in relation to the axis (OY) and to the lines of pixels of the array optical sensor. This inclination, less than 8°, makes it possible in certain cases to improve the resolution of the images obtained. In what follows, details are given on examples without inclination.

Those skilled in the art will know how to carry out similar alternatives with a non-zero inclination.

The illuminating devices are distributed here regularly along (OX), with their ends being aligned on an axis parallel to (OX).

In particular, they are regularly distributed along the length L2 of the detecting surface 125 of the array optical sensor, with a repetition pitch P1 equal to the pixel pitch of the array optical sensor along the axis (OX), for example 25 µm or 50 µm.

Alternatively, the repetition pitch P1 of the illuminating devices is constant, and separate from the pixel pitch P2 pixel of the array optical sensor along (OX). In particular, the repetition pitch P1 can be an integer multiple of P2. For example P2 is about 50 µm, even 25 µm, and P1 is between 10 and 20 times greater, for example about 500 µm, preferably less than a millimetre. Each illuminating device can then extend above or below several lines of pixels of the array optical sensor.

During operation, all of the illuminating devices are not lit simultaneously, and it is possible to process only the pixels of the array optical sensor that are not located directly under a lit illuminating device.

The illuminating means 111 are connected to means for controlling 130, configured to light and extinguish each one of the illuminating devices 1110 independently of one another.

The means for controlling 130 are configured to form at least one light pattern, corresponding to a pattern formed at an instant t by the illuminating devices 1110, among which at least one is lit and at least one is extinguished.

A light pattern corresponds to the spatial distribution of the illumination provided at an instant t by the illuminating means, on the contact surface 106. Here, each light pattern extends above the array optical sensor, over the same width L1 as the detecting surface of the latter. Each light pattern is comprised of one or several lighting strips extending over the entire width L1.

When the illuminating devices are close enough to the contact surface, for example less than a millimetre, the distances between two lighting strips correspond to distances between lit illuminating devices.

A light pattern can be a binary image wherein a high level corresponds to a lit illuminating device and a low level corresponds to an extinguished illuminating device.

Alternatively, it can have variations in amplitude, according to a light intensity emitted by each illuminating device.

Each light pattern is uniform according to (OY), or at least uniform along an axis that is slightly inclined with respect to (OY) (8° or less). In other terms, each light pattern is uniform along the axis of elongation of the illuminating devices. Details on the different examples of uniform light patterns along (OY) are provided in what follows.

This uniformity is carried out in a particularly easy manner, thanks to the arrangement in parallel strips of the illuminating devices. In particular, it is not necessary to carry out matrix illuminating means that have for example more than 3 lines and more than 3 columns. In other terms, the illuminating means according to the invention make it possible to offer a structured lighting, without however requiring voluminous connection or control devices.

The term step of illumination refers to the illumination of the print by the illuminating means 111, according to a single light pattern, or according to a succession of several light patterns that are different from one another.

For each step of illumination, an image using the array optical sensor 112 is acquired.

It is understood, without it having to be specified, that the light pattern formed by the illuminating means is different at each step of illumination. As such, different information can be obtained at each one of the steps of illumination.

Light pattern, or the succession of several light patterns, associated with an acquired image, is defined by an illumination function.

At each step of illumination, the illuminating devices are not all lit simultaneously during the acquisition of the same image. As detailed in what follows, certain illuminating devices remain extinguished, and others lit, during the entire duration of the acquisition of the image. Alternatively, the illuminating devices are in a lit or extinguished state, according to the instant considered during the duration of the acquisition of the image.

The fingerprint has a design formed as a hollow, as such defining ridges on the latter, and valleys. Pixel selection means 140 receive an image acquired by the array optical sensor.

They are configured to select, on this image, the pixels corresponding to the valleys of the print, or pixels corresponding to the ridges of the print. This step will not be described any further here, as it is known to those skilled in the art.

The pixels that correspond to the ridges of the print can be called paired pixels. The pixels that correspond to the valleys of the print can be called non-paired pixels.

In what follows, one or the other series of selected pixels will be used, for example the pixels corresponding to the ridges of the print.

According to the characteristics of the tissues, for example dry or oily, one or the other series of pixels selected can be favoured.

The selected pixels are received by means for calculating 150, arranged to extract therefrom one or several optical characteristics, typical of the response of the imaged fingerprint to the illumination provided by the illuminating means 111.

This optical characteristic preferably corresponds to a response of the material comprising the print.

This response can be considered in the Fourier space. This is for example an optical transfer function, in particular a line spread function, an edge spread function, a contrast transfer function, etc. It can also be a modulation transfer function.

Alternatively, this response is considered in the real space, and this is for example simply an intensity profile according to a distance to a lighting strip of the light pattern.

The means for calculating 150 are also configured to use the optical characteristic thus extracted, in order to determine the respective values of at least two optical coefficients, characteristic of the material comprising the imaged fingerprint.

These optical coefficients are advantageously an absorption coefficient $\mu_A$ and a reduced scattering coefficient $\mu_S'$, such as defined in the description of the invention.

The determination of the values of these coefficients uses a model 151.

This is in particular a predictive model of the response of the fingerprint to the illumination provided by the illuminating means 111. This model depends on the values of the optical coefficients $\mu_A$ and $\mu_S'$. It can be considered that this is a predictive model of the response of a material with known coefficients $\mu_A$ and $\mu_S'$.

The means for calculating 150 are connected to means 160 for comparing said values of the characteristic optical coefficients of the print, and reference data 161, in order to distinguish values associated with a fingerprint comprised of living human tissue and values associated with a fingerprint comprised of materials that are neither living nor human.

Alternatively, the model 151, used to calculate the values of $\mu_A$ and $\mu_S'$, is a set of experimental or theoretical responses of the type of optical characteristic extracted, with each response being associated directly with known values of optical coefficients $\mu_A$ and $\mu_S'$ and with information on the material that has these values of the optical coefficients $\mu_A$ and $\mu_S'$. In particular, each response is associated with information according to which said material is, or is not, a living human tissue. In this case, the last step of the comparison is not always necessary.

Figure 1C:
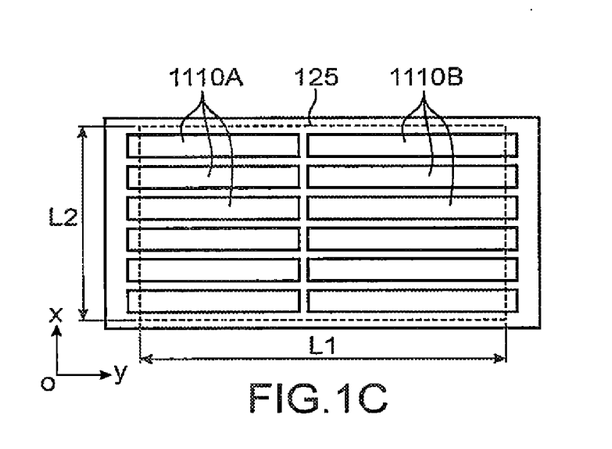
Figure 1D:
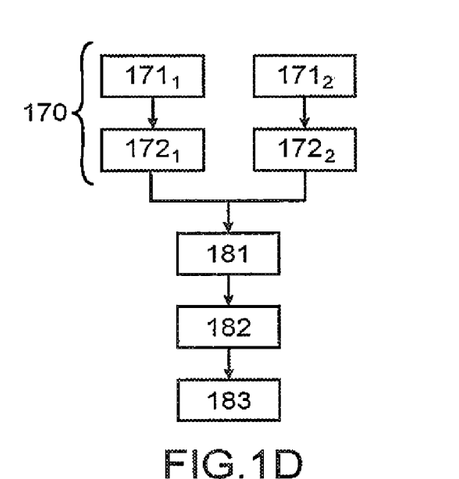
FIG. 1D diagrammatically show the steps of a method according to the invention.

FIG. 1D diagrammatically shows the steps of a method according to the invention.

The print is illuminated using illuminating means 111, by a single, or a succession of light pattern(s) (step $171_1$). Durant this step of illumination, an image is acquired using the array optical sensor 112 (step $172_1$). These two steps are repeated at least once, for example twice, in order to form a step 170 of illumination of the print and acquisition of images.

The several acquisitions are made during a very short interval of time, during which the finger is immobile or almost (for example a maximum displacement of the finger less than 50 micrometres). Where applicable, it can be identified that there has not been any movement, and where applicable an area of movement can be rejected, even all of the raw images acquired starting from a predetermined instant.

At the step 181, on each image acquired, the pixels associated with the ridges of the print are selected. Alternatively, on each image acquired, the pixels associated with the valleys of the print are selected.

This selection is advantageously carried out using an image in which the entire print is sufficiently lit.

For example, an image is furthermore acquired when all of the illuminating devices are lit. This image is acquired during the same very short time interval such as described hereinabove. In this image, it is easy to identify all of the pixels associated with the ridges of the print, and all of those associated with the valleys of the print.

The location of these pixels is the same on all of the other images, acquired by the sensor in the step 170. It is then possible to easily select the pixels associated with the ridges or with the valleys of the print, on the other images acquired by the sensor, even where the print is poorly lit due to the structured lighting.

Instead of acquiring an image when all of the illuminating devices are lit, such an image can be calculated, by combining the several images acquired for the different combinations of at least one lit illuminating device and at least one extinguished.

At the following step 182, the optical characteristic that define the response of the fingerprint to the illuminations implemented in the step 170 is extracted, and this optical characteristic is used in order to determine the values of the characteristic optical coefficients.

In the step 183, the set of values of the characteristic optical coefficients is compared with the reference data, in order to determine if the imaged fingerprint is a true print or not.

In other terms, a classification is carried out, based for example on a statistical approach of the "scoring" type, and on prior learning from a database comprised of authentic human tissues and of materials typically used to carry out fraudulent prints.

FIG. 1C shows an alternative of the illuminating devices of FIG. 1B, wherein the illuminating devices are distributed into two series.

A first series of illuminating devices 1110A extends over the left portion of the fingerprint sensor.

It is comprised of illuminating devices that each extend uninterruptedly over about half of the detecting surface 125 of the array optical sensor. They are distributed along the length L2 of the detecting surface 125.

They extend in particular above said detecting surface, from the middle of the latter in the direction of the width L1, to the edge of this detecting surface and even beyond.

A second series of illuminating devices 1110B extends over the right portion of the fingerprint sensor.

The second series of illuminating devices 1110B is the symmetric of the first series 1110A with respect to a plane parallel to (XOZ) passing through the middle of the detecting surface 125, in the direction of its width L1.

Each illuminating device 1110A of the first series and its symmetric 1110B in the second series, are spaced apart by a distance that does not exceed one third of the width L1 of the detecting surface 125, more preferably only a few micrometres.

Here again, an illumination structured into strips is very easily carried out, by being able to position the control units of each illuminating device at the edge of the detecting surface 125.

Figure 2:
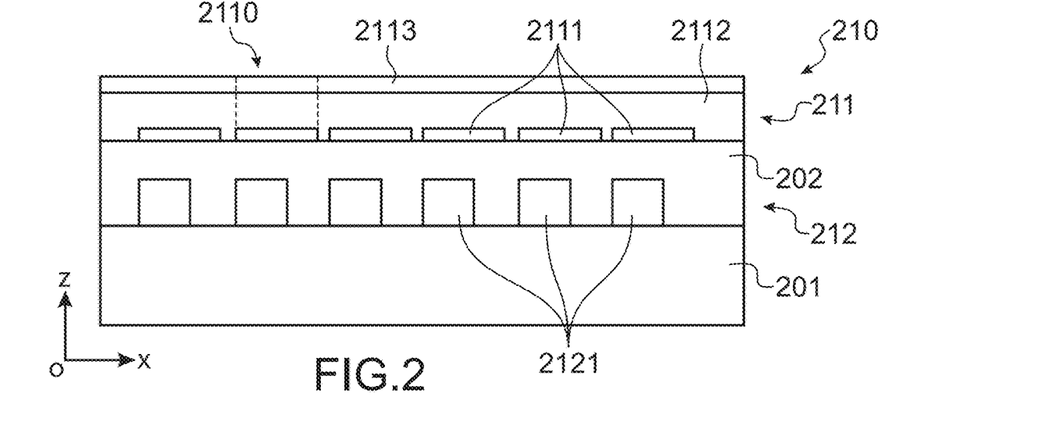
FIG. 2 shows an example of a papillary print sensor, specially adapted to implementing a method according to the invention.

FIG. 2 shows an advantageous embodiment of a fingerprint sensor 210, adapted for implementing a method according to the invention.

The illuminating means 211 are formed by organic light-emitting diodes called OLEDs each forming an illuminating device 2110 according to the invention.

The OLEDs are arranged above the array optical sensor 212. They have for example shapes of strips, in particular strips parallel between them and parallel to the lines of pixels of the array optical sensor.

The OLEDs, and the photodetectors 2121 of the array optical sensor 212, are formed on a single substrate 201. In the example shown, the OLEDs are formed on a planarising layer 202 that covers the photodetectors 2121.

Each OLED 2110 is defined by the intersection between a lower electrode 2111, a stack 2112 of at least one layer of organic semiconductor material, and an upper electrode 2113. In the example shown, the lower electrodes are each specific to an OLED, while a single stack made of organic semiconductor material and a single upper electrode extend above the set of photodetectors 2121.

Many alternatives can be implemented, for example with a stack of organic semiconductor material specific to each OLED.

In each embodiment of a print sensor according to the invention, the distance between the contact surface and the array optical sensor is less than 25 µm. Here, the array optical sensor being arranged under the OLEDs, this implies a low thickness of the OLEDs, advantageously less than 25 µm and even 20 µm.

This embodiment is particularly advantageous, in particular because it offers a large variety of dimensions and shapes of the illuminating devices. It is possible for example to carry out OLEDs in the shape of a trapeze, or as a zigzag, that extend along (OY) and which each provide lighting in a strip.

This embodiment makes it possible to carry out illuminating devices of very small size along the axis (OX), for example in such a way as to extend only between two rows of photodetectors of the array optical sensor, without covering the photosensitive areas of the latter. For example, the dimension along (OX) of each OLED is less than 50 µm, or 25 µm, even less than 10 µm.

This furthermore makes it possible to favour the quantity of light that arrives in the tissues, and to minimise the scattering of the light before reaching the papillary print.

This embodiment is also particularly compact, because it does not impose the presence of control transistors of the OLEDs located under the detecting surface. The latter can be simply at the edge of the detecting surface.

Finally, there is little light that can go directly from the OLEDs to the pixels of the array optical sensor. And even if there were some, it would be sufficient to not use the pixels located directly under the lit OLEDs.

Figure 3A:
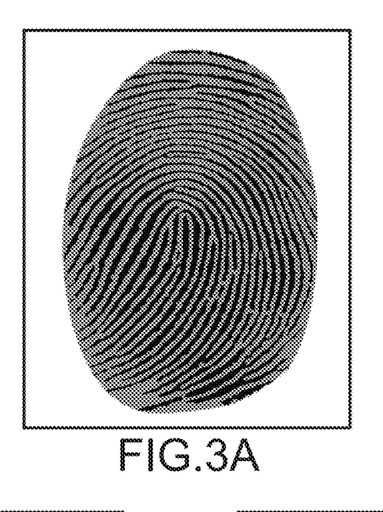
FIGS. 3A to 3C show a step of selecting pixels according to the invention.
Figure 3B:
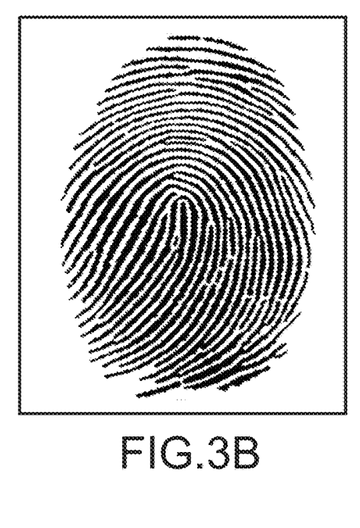
Figure 3C:
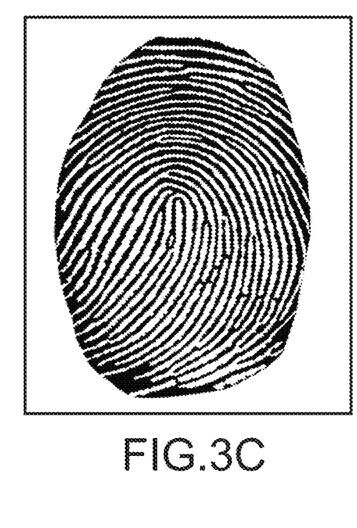

FIGS. 3A to 3C diagrammatically show the selection of pixels according to the invention.

FIG. 3A diagrammatically shows an image acquired by the array optical sensor.

FIG. 3B shows in black the pixels associated with the ridges of the print.

FIG. 3C shows in black the pixels associated with the valleys of the print.

In what follows, by way of example, it is considered that interest is given to the pixels associated with the valleys of the print.

However, the method can also be implemented according to the invention both using pixels associated with the valleys of the print, and using pixels associated with the ridges of the print, with all of this information able to be used to improve the discriminating power of the classifier that will be used at the step of comparing.

Separately considering the pixels associated with the ridges and those associated with the valleys makes it possible to not be disturbed by the shape of the lines of the print, with the contrast appearing due to the difference in the coupling between the tissues in physical contact with the contact surface 106 (coupled to the print sensor) and the tissues without physical contact with the contact surface 106 (not coupled to the print sensor). Where applicable, the missing pixels can be interpolated. Filterings can also be carried out in order to improve the robustness with regards to any classification errors between pixels of the valleys and pixels of the ridges. The filtering is for example an average, or a median, on a segment parallel to the illuminating devices, and of a length between 1 mm and 3 mm.

The illumination of the print shall be described now in detail, and the determination of the values of the optical coefficients, here $\mu_A$ and $\mu_S'$.

Figure 4:
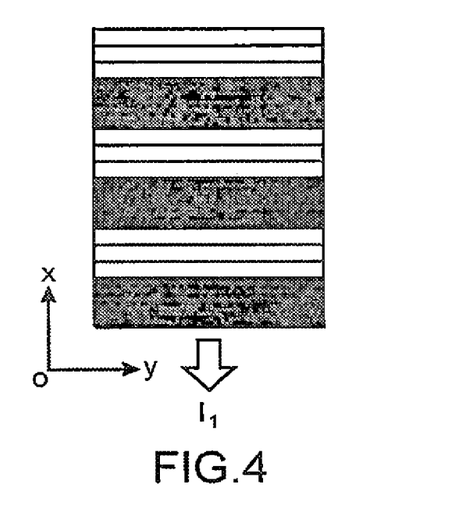
FIG. 4 shows a first embodiment of steps of illumination of the array optical sensor, and acquisition of an image.

According to a first embodiment of the method according to the invention, the illuminating means provide an illumination associated with an illumination function spatially which is periodic along (OX).

In particular, they form on the contact surface defined hereinabove, a light pattern, defined by a periodical illumination function according to (OX).

FIG. 4 shows the illuminating means, formed alternatively of three lit illuminating devices and three extinguished illuminating devices. The periodical illumination function is therefore a slot function, of frequency $f$.

The light pattern is considered on the contact surface where the finger is positioned. Where applicable, the illumination provided by the illuminating means compensates the inhomogeneities that will appear due to the distance between the illuminating means and this contact surface. This compensation is not always required, in particular when the distance between the illuminating means and the contact surface is small, for example less than 700 µm.

The method can include an initial step of partitioning each image acquired, according to (OX) and/or according to (OY), in order to form several regions of interest.

In each image, the regions of interest are defined by the same coordinates.

Each region of interest includes at least one complete period of the periodical illumination function, preferably several periods (in order to have a redundancy on the region of interest).

Each region of interest has for example a surface between 5 and 20 mm², whereon it is assumed that the material comprising the print is homogeneous.

In what follows, we are positioned inside such a region of interest and after selecting pixels associated for example with the valleys of the print.

If the lighting strips forming the light pattern are oriented along an axis corresponding (or close) to (OY), a prior step of smoothing an image can be implemented, by averaging, in each one of the regions of interest, the rows of pixels selected along the axis (OY). This smoothing can possibly be supplemented with a smoothing along the axis (OX), via a usual method (median and/or average filter). It is always sought however to filter less along (OX) than along (OY).

According to the invention, it is calculated the convolution of a point spread function (PSF) associated with predetermined coefficients $\mu_A, \mu_S'$, with the illumination function on the contact surface of the print sensor.

This convolution defines a diffuse reflectance, referred to as predicted reflectance, associated with a set of values of the coefficients $\mu_A, \mu_S'$. This reflectance is predicted by a predictive model, which depends on the values of the coefficients $\mu_A$ and $\mu_S'$.

The illumination function corresponds to the light pattern, or the succession of light patterns, formed by the illuminating devices on the contact surface during the acquisition of an image. The illumination function is therefore uniform along (OY), or along an axis that is slightly inclined in relation to (OY), which simplifies the convolution calculation.

Using pixels selected on the image acquired by the array optical sensor, a diffuse reflectance is then measured, referred to as experimental. This is an optical characteristic that defines the response of the material comprising the fingerprint, to an illumination defined by said illumination function.

The values of the coefficients $\mu_A, \mu_S'$ associated with the print can be determined, by minimising a difference between the predicted reflectance, and the experimental reflectance.

The mean square deviation between these two magnitudes is for example minimised.

In other terms, considering an illumination function on the contact surface defined by $E(x_i, y_j)$ and an array optical sensor with i lines and j columns, the experimental reflectance $R_{exp}$ obtained using the image acquired is compared with the result of the convolution of said predetermined point spread function with the illumination function used. In particular, the coefficients $\mu_A, \mu_S'$ are sought that minimise a square deviation $X_0^2$ between these two magnitudes:

$$X_0^2(\mu_A, \mu_S') = \sum_i (R_{exp}(x_i) - R_{pred}(x_i, \mu_A, \mu_S'))^2 \quad (1)$$

With:

$$R_{pred}(x_i, \mu_A, \mu_S') = \frac{1}{N}\sum_j^N E(x_i, y_j) * PSF_{pred}(x_i, y_j, \mu_A, \mu_S') \quad (2)$$

In other terms, a mean square deviation is minimised between the measured intensities and the theoretical intensities.

$X_0^2$ is an estimator, corresponding to a quadratic sum of the differences between experimental reflectances and predicted reflectances. Consideration is given here to mean reflectances each associated with a line of pixels.

The convolution is advantageously calculated in the Fourier space. The calculation in the Fourier space is particularly advantageous when the illumination function has symmetries.

In practice, $E(x_i, y_j)$ is the image of the illumination function on the sensor. It can be obtained for example, by imaging a sight on the sensor with the illumination pattern considered.

The experimental diffuse reflectance $R_{exp}$ is deduced from the image after correction in relation with the image $I_{REF}$ of a reference standard of which the optical properties $\mu_{A,REF}$, $\mu_{S,REF}'$ are known:

$$R_{exp}(x_i) = I(x_i) \cdot \frac{R_{REF}(x_i, \mu_{A,REF}, \mu_{S,REF}')}{I_{REF}(x_i)} \quad (3)$$

This calculation can be implemented independently in several regions of interest such as defined hereinabove.

In the example shown in FIG. 4, the illumination function is a slot function, of frequency $f$.

The experimental and predicted reflectances are then contrast transfer functions at the frequency $f$, noted as $CTF_{exp}(f)$, respectively $CTF_{pred}(f)$.

The experimental contrast transfer function at the frequency $f$ is an optical characteristic that defines the response of the material comprising the fingerprint, to a spatially periodic illumination in slots at the spatial frequency $f$.

The experimental contrast transfer function at the frequency $f$ can be calculated using the following formula:

$$CTF_{exp}(f) = \frac{\text{Max}(f) - \text{Min}(f)}{\text{Max}(f) + \text{Min}(f)} \quad (4)$$

$\text{Max}(f)$ and $\text{Min}(f)$ correspond respectively to the minimum intensity and to the maximum intensity of the pixels of the region of interest, where applicable after correction of the noise and of the offset brought by the fingerprint sensor.

If the region of interest comprises several lighting periods, these values will be consolidated by searching for the local maxima and minima of each period of the lighting.

The experimental contrast transfer function at several frequencies is determined, more preferably two frequencies because it is sought to determine the values of two coefficients, $\mu_A$ and $\mu_S'$.

Preferably, the zero frequency (uniform lighting) is chosen, and a non-zero frequency $f_1$.

The zero frequency is advantageous because the image under uniform lighting is generally acquired for the needs of the print sensor, and pre-recorded. Otherwise, the contrast transfer function at the zero frequency can be approached via the average value on the image.

The set of experimental values of said contrast transfer function, is then compared with a predictive model of this contrast transfer function. This model depends on the values of the coefficients $\mu_A$ and $\mu_S'$.

For this, the parameter, or estimator, $X_1^2$ is defined, corresponding to the weighted quadratic sum of the difference between the experimental contrast transfer function and the contrast transfer function predicted by the model. A weighted quadratic sum is carried out, in order to consolidate the results over all of the frequencies $f_i$ used:

$$X_1^2(\mu_A, \mu_S') = \Sigma_1 \alpha_i (\text{CTF}_{mes}(f_i) - \text{CTF}_{pred}(\mu_A, \mu_S', f_i))^2 \quad (5)$$

with:

$\alpha_i$ a weighting coefficient corresponding to the importance and/or to the degree of reliability that is given to the frequency $f_i$.

$\text{CTF}_{pred}$ designating the theoretical contrast transfer function, predicted by the model for each possible pair of values of $\mu_A$ and $\mu_S'$ at the frequency $f_i$ The pair $(\mu_A; \mu_S')$ that minimises the estimator $X_1^2(\mu_A, \mu_S')$ is then determined, using a usual method of minimisation. The absence of local minima shall be ensured.

This method has the advantage of being independent of the illumination power, but can be influenced by the presence of a possible offset (noise due to ambient lighting, in particular). In most cases, this can be overcome, by prior subtraction of the images with a black image (image acquired when all of the illuminating devices are extinguished).

Alternatively, the comparison can be carried out over the ratio between the contrast transfer function at the frequency $f_i$ and the contrast transfer function at a different frequency $f_N$ which is away from the $f_i$ (often, $f_N$ will be chosen small in comparison with $f_i$). The latter method has the advantage of overcoming both the influence of a possible offset and of the long-term fluctuations of the illumination power. It however requires an additional frequency (therefore three images).

Where applicable, the point spread function associated with the fingerprint sensor itself can be taken into account, for example by dividing the contrast transfer functions measured by the known contrast transfer function of the print sensor.

The predictive model used is based for example on an analytical approach, or on a stochastic approach of the Monte Carlo type. Details are not provided here on these models, that those skilled in the art will know how to find, see for example the article of the Journal of Biomedical Optics, 024012, March/April 2009, Vol. 14(2), "*Quantitation and mapping of tissue optical properties using modulated imaging*". Such a model makes it possible to simulate the response of a sample of given coefficients $\mu_A$ and $\mu_S'$, to known illumination conditions. It takes account of the conditions for acquiring images, for example the optical index of the medium contiguous with the print (which differs according to ridges or valleys are considered).

Figure 5:
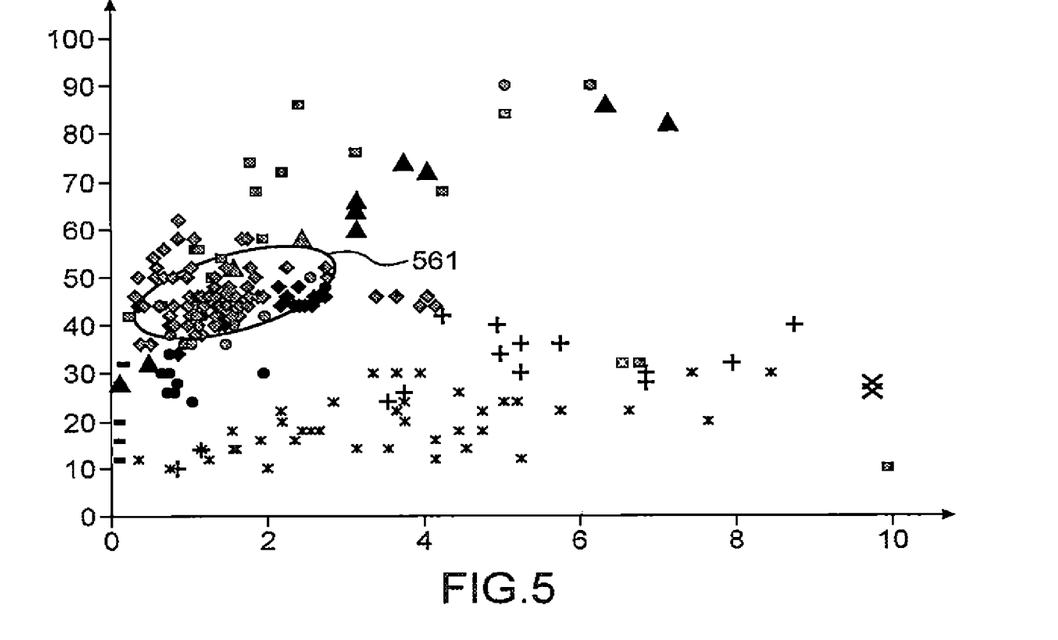
FIG. 5 shows a step of comparison with reference data.

Then, the values of $\mu_A$ and $\mu_S'$ are compared to reference data such as shown in FIG. 5, and obtained for example by measuring values of $\mu_A$ and $\mu_S'$ on known samples.

FIG. 5 shows on the abscissa the value $\mu_A$, and on the ordinates the value $\mu_S'$. The small triangles correspond to measurements of $\mu_A$ and $\mu_S'$ on an imitation made of latex of a fingerprint. In the same way, the small squares correspond to gelatine, the crosses to wood glue, the x to a printed transparency, the X to paper.

Only the diamonds correspond to true fingers.

These measurements make it possible for example to define a border, or critical threshold 561, that encompasses a maximum of measurements corresponding to true fingers and excluding a maximum of measurements corresponding to false fingers.

Alternatively, a classification function is defined, for example of the ellipse type, relative to a mean deviation between the values of the characteristic coefficients measured on the print studied, and those measured on true fingers. A coefficient relative to a probability that the print studied corresponds to a true finger is obtained.

Thanks to the partition into several regions of interest, the values of $\mu_A$ and $\mu_S'$ can be determined separately in each one of these regions of interest, and as such the print can be analysed into several emplacements distributed over its entire surface.

Alternatively, the several local values of $\mu_A$ and $\mu_S'$ are combined, before carrying out a comparison with reference data, the print then being analysed globally.

Figure 6:
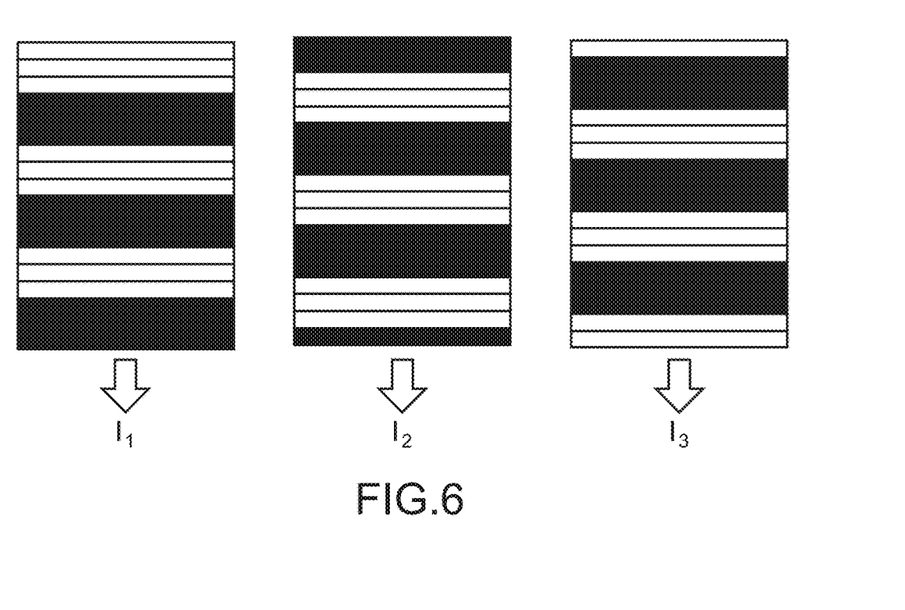
FIG. 6 shows a second embodiment of steps of illumination of the array optical sensor, and acquisition of an image.

According to an alternative of this embodiment, the periodical illumination function is a sinusoidal function, with frequency $f$.

Such an illumination function can be carried out by acting on a supply current of each illuminating device, in such a way as to modulate the light intensity emitted by each one of them.

The result of the convolution of the point spread function with the illumination function is then a modulation transfer function, at the frequency $f$.

The experimental and predicted reflectances are then modulation transfer functions at the frequency $f$, noted as $\text{MTF}_{exp}(f)$, respectively $\text{MTF}_{pred}(f)$.

The experimental modulation transfer function at the frequency $f$ can be calculated as the contrast transfer function:

$$\text{MTF}_{exp}(f) = \frac{\text{Max}(f) - \text{Min}(f)}{\text{Max}(f) + \text{Min}(f)} \quad (6)$$

Alternatively, the $\text{MTF}_{exp}$ can also be estimated by successively phase shifting the sine of 120°, three times, and by taking an image each time (noted as $I_1$, $I_2$ and $I_3$), for each frequency $f$ considered.

In this case, the $\text{MTF}_{exp}$ is deduced from the relationship:

$$\text{MTF}_{exp}(f) = \frac{M_{AC}(f)}{M_{DC}(f)} \quad (7)$$

$M_{AC}(f)$ and $M_{DC}(f)$ able to be obtained using the equations hereinbelow:

$$M_{AC}(f) = \quad (8)$$
$$\frac{\sqrt{2}}{3}\{(I_1(f) - I_2(f))^2 + (I_2(f) - I_3(f))^2 + (I_3(f) - I_1(f))^2\}^{1/2}$$

$$M_{DC}(f) = \frac{1}{3}[I_1(f) + I_2(f) + I_3(f)] \quad (9)$$

Then, the predicted and experimental modulation transfer functions are compared, as detailed hereinabove concerning contrast transfer functions, and by using an estimator $X_2^2$ defined by:

$$X_2{}^2(\mu_A,\mu_S')=\Sigma_1\alpha_i(\text{MTF}_{mes}(f_i)-\text{MTF}_{pred}(\mu_A,\mu_S',f_i))^2 \quad (10)$$

FIG. 6 very diagrammatically shows light patterns associated with the same illumination function of the sine type, with period f, for a phase shift of 0° (acquisition of the image $I_1$), for a phase shift of 120° (acquisition of the image $I_2$), and for a phase shift of 240° (acquisition of the image $I_3$).

More preferably two frequencies are considered, of which the zero frequency.

It can be seen that in order to limit the number of images, it is possible to consider $M_{DC}$ as being a modulation with a zero frequency (this is also the value of an image under uniform lighting). It is then possible to use only three images to calculate $M_{AC}(f)$ and $M_{DC}$.

The calculation taught in equation (10) can be influenced by the presence of a possible offset (noise due to the ambient light, in particular).

When the offset varies over time, it can be advantageous to make the comparison of equation (10) over the magnitudes $M_{AC}(f)$ rather than over the MTF(f), this in order to overcome the variations of the offset (but to the detriment of the fluctuations in the illumination power).

As with a slot function, the comparison can also be carried out on the ratio between the modulation transfer function at the frequency $f_i$ and the modulation transfer function at a different frequency $f_N$ and away from the $f_i$.

A clever method shall now be described to carry out lighting via an illumination function of the sine type, by using an integration frequency of the pixels of the array optical sensor, and a scanning frequency of the lighting of each illuminating device, with these two frequencies being synchronised.

The array optical sensor is sequenced by a single clock. At each clock tick, a line is read and another line is reset.

Here, a line located at a distance N from the line read is reset.

There is then:

T=0, resetting of the line N, reading of the line 0.
T=1, resetting of the line N+1, reading of the line 1.
And so on until T=N, resetting of the line N+N, reading of the line N.

It can be seen that the integration time of a line i starts at T=i–N and finishes at T=i.

Figure 7A:
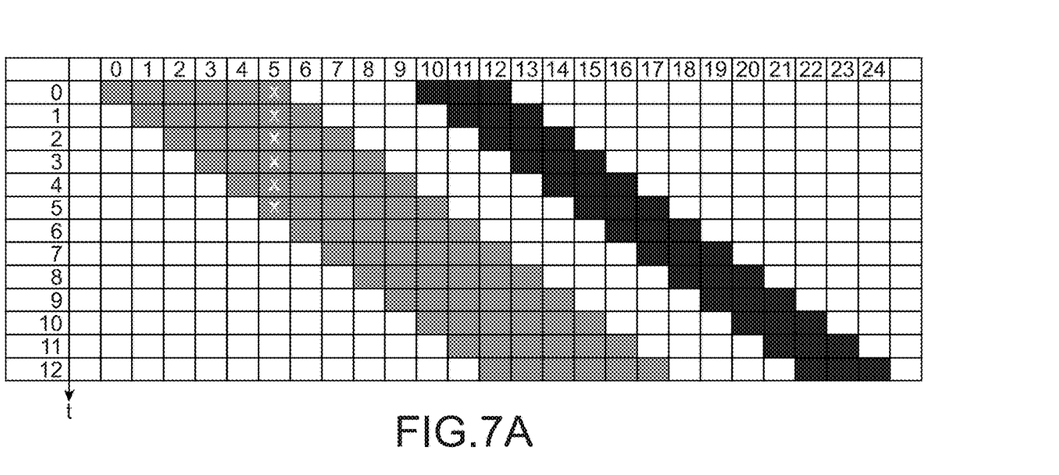
FIGS. 7A and 7B show a third embodiment of steps of illumination of the array optical sensor, and acquisition of an image.

It is furthermore assumed that at each instant, one or several adjacent illuminating devices are lit, with the others being extinguished. It is therefore possible to scan the lit illuminating devices synchronously with the scanning of the integration of the pixels of the array optical sensor. Here, three adjacent illuminating devices are at each instant in the lit state.

In other terms, the various light patterns formed at each instant differ simply by their phase.

In order to simplify the explanation, it is considered that the illuminating devices are distributed along (OX) according to the same pitch as the pixels of the array optical sensor. It is assumed that the illuminating device i is superimposed on the line of pixels i.

M denotes the offset, in lines of pixels, between the line of pixels read and the closest lit illuminating device. Each illuminating device provides lighting in a strip.

If for example N=5, and the advance of the line is M=10, there will be:

T=0, reading of the line 0, resetting of the line 5, lighting of the strips 10, 11 and 12.
T=1, reading of the line 1, resetting of the line 6, lighting of the strips 11, 12 and 13.
T=2, reading of the line 2, resetting of the line 7, lighting of the strips 12, 13 and 14.
T=3, reading of the line 3, resetting of the line 8, lighting of the strips 13, 14 and 15.
T=4, reading of the line 4, resetting of the line 9, lighting of the strips 14, 15 and 16.
T=5, reading of the line 5, resetting of the line 10, lighting of the strips 15, 16 and 17, etc.

This is shown in FIG. 7A, where the axis of the ordinates is the time, and the axis of the abscissa is the number of the line of pixels or of the lighting strip (corresponding to an illuminating device).

At each line of time, the lines of pixels integrating the light are shown in grey, and the lit illuminating devices in black.

If consideration is given to the illuminating devices that were lit during the integration of a particular line, we then obtain, for example for the line of pixels 5: an illumination by the illuminating devices 10 to 17 with a contribution of 1 for the illuminating device 10, 2 for 11, 3 for 12 to 15, 2 for 16 and 1 for 17. The contribution corresponds to a duration, as a number of clock ticks, during which the pixels of the line 5 integrate the light of said illuminating device.

Figure 7B:
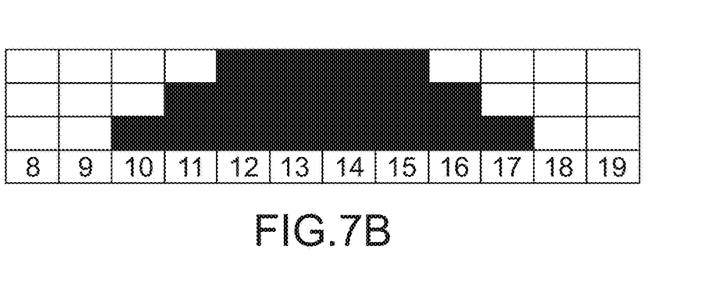

FIG. 7B shows the lighting profile seen by the line 5. On the abscissa the lighting strips, or lit illuminating devices, and on the ordinates the contribution of each strip.

The following line of pixels will have had a similar lighting profile.

There is as such an illumination pattern that has a constant offset with the lines of imagery.

It can as such be arranged that the array optical sensor receives lighting associated with a periodical illumination function. It can be considered that the function is periodical, after integration over the total duration of integration of all of the lines of pixels. This can loosely be described as time periodical function.

The illumination pattern seen by each line of pixels can be a homogenous strip (a single illuminating device is lit in each line), or a shape of a trapeze such as shown (when the number of lit illuminating devices is greater than 1 and different from N (N is the integration time), or a triangle shape when the number of lit illuminating devices is equal to N.

If the number of illuminating devices is different from the number of lines of pixels, for example half, the same principle is applied by dividing by two the scanning frequency of the lit illuminating devices (therefore by lighting a same pattern during the reading of two lines of pixels).

The illumination pattern seen by each line of pixels can have the shape of a boss, as shown here, which approximates a sinusoidal shape. An approximation can as such be made of a sinusoidal periodical illumination function, of frequency $f$.

$\mu_A$ and $\mu_S'$ can then be determined for each line of pixels, even for each pixel.

Each line of pixels sees the same known phase of the illumination function.

In FIG. 7B, each line of pixels is illuminated by a sine illumination function having a first known phase shift, here a zero phase shift. A first image is acquired.

Then, each line of pixels can be lit by a sine illumination function, phase shifted by π in relation to the first phase shift (which here is a phase shift of π, corresponding to a shape with a hollow). A second image is acquired.

$M_{DC}(f)$ can then be approximated as being the average of the first and of the second images, and $M_{AC}(f)$ as being the difference between the first and the second image.

MTF$_{exp}$ can then be estimated with only two images.

Figure 8:
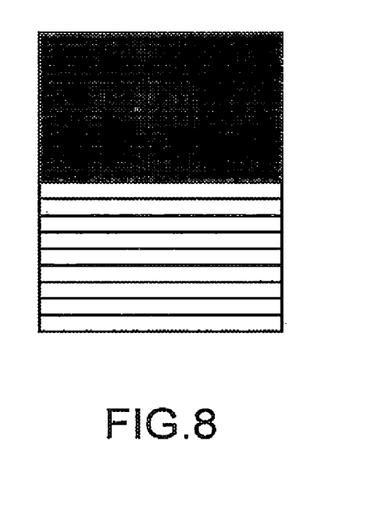
FIG. 8 shows a fourth embodiment of steps of illumination and acquisition of an image.

Alternatively, the print is illuminated by an illumination function of the edge type, such as shown in FIG. 8. This illumination function is formed by a series of lit neighbouring illuminating devices, followed by a series of extinguished neighbouring illuminating devices. A region of the print located in the vicinity of the rising edge of the edge is thus characterised. Different regions of the print can be characterised, by different positions of this falling edge. Several edges can be formed simultaneously, with the condition that they are sufficiently spaced apart, for example at least 3 mm from one another on the contact surface, and preferably between 3 and 10 mm, even between 3 and 5 mm.

The result of the convolution of the point spread function with the illumination function is then an edge spread function (or ESF).

For example ESF$_{exp}$(x) (experimental edge spread function) is determined using a table that groups together, for each line of pixels, the mean intensity I(x) of the pixels along (OX). There is then:

$$ESF_{exp}(x) = \frac{I(x) - \mu}{\sigma} \quad (11)$$

with μ the mean of the I(x) and σ the standard deviation of the I(x).

The line spread function is the derivative according to x of the edge spread function. Note that it is easier to compare line spread functions than edge spread functions. $\mu_A$ and $\mu_S'$ can therefore be determined by minimising the following function:

$$X_3^2(\mu_A, \mu_S') = \sum_i (LSF_{exp}(x_i) - LSF_{pred}(x_i, \mu_A, \mu_S'))^2 \quad (12)$$

the sum on i corresponding to the sum on the lines of pixels of the array optical sensor.

LSF$_{exp}$ can be calculated numerically, using finite differences:

$$LSF_{exp}(x) = \frac{dESF_{exp}(x)}{dx} \quad (13)$$

The comparison mentioned in equation (12) can also be made between MTF (instead of the LSF) by taking the Fourier transform of the LSF.

Figure 9:
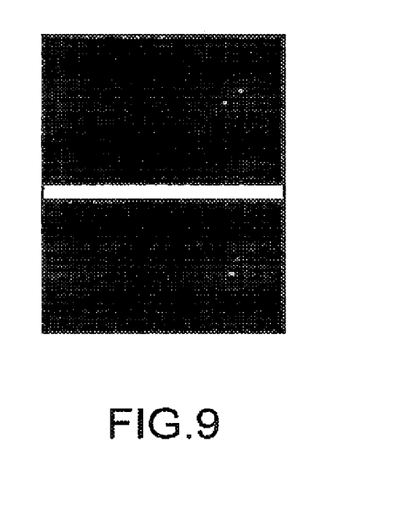
FIG. 9 shows a fifth embodiment of steps of illumination and acquisition of an image.

According to another alternative, the print is illuminated by an illumination function of the thin line type, such as shown in FIG. 9, in order to have a direct approximation of the LSF. This illumination function is formed more preferably by a single lit illuminating device, surrounded by extinguished illuminating devices. A region of the print located in the vicinity of the lit illuminating device is thus characterised. Different regions of the print can be characterised, by different positions of the lit device. Several illuminating devices can be lit simultaneously, two lighting strips formed on the contact surface by illuminating devices lit simultaneously and non-adjacent, being separated along (OX) by at least 3 mm, preferably between 3 mm and 10 mm, or even between 3 mm and 5 mm.

The result of the convolution of the point spread function with the illumination function is then a line spread function (or LSF).

Advantageously, these measurements of LSF and of ESF can be taken with better precision when a small angle (less than 8°) is used between the axis (OY) and the direction of the forms of the light pattern.

According to another alternative, instead of considering differences between an experimental reflectance and a predicted reflectance, for different lines of pixels of the array optical sensor and for a phase of an illumination function, consideration is given to differences between an experimental reflectance and a predicted reflectance, for the same line of pixels of the array optical sensor and for different phases of the illumination function.

For example, a line of pixels is considered and its response for different positions of the line of light associated with an illumination function of the thin line type is measured.

This response consists in a profile that decreases when the distance to the thin line increases.

The influence of an offset can be subtracted from these profiles (ambient light), corresponding to a contribution of light that does not decrease when the distance to the thin line increases.

It is possible to obtain using such a profile the absorption and reduced scattering coefficients, by comparing this profile with a series of profiles each associated with a pair of known values of these coefficients, and by selecting the closest resembling profile.

Alternatively, calculations similar to those described hereinabove are implemented, in particular with equations (1) and (2), considering differences between an experimental reflectance and a predicted reflectance.

Then, as detailed hereinabove, the pair of values of the absorption and reduced scattering coefficients are compared with reference data.

Figure 10:
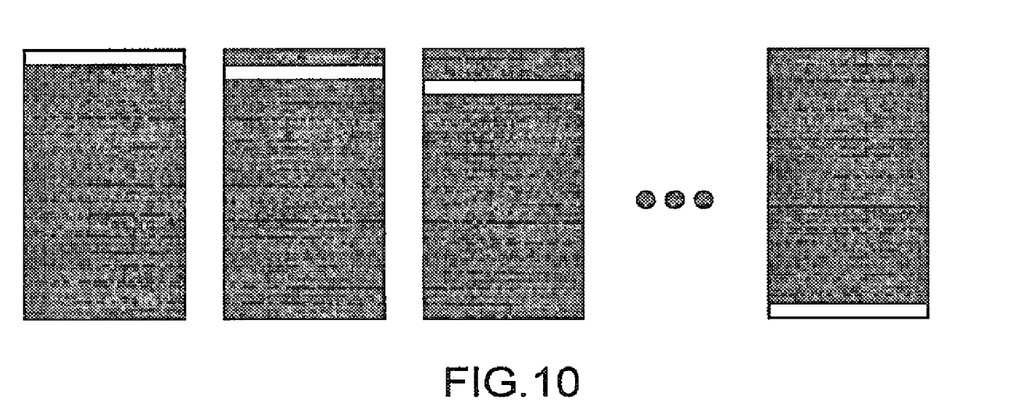
FIG. 10 shows a sixth embodiment of steps of illumination and acquisition of an image.

FIG. 10 shows the scanning of the lighting of the illuminating devices.

In FIG. 10, a single illuminating device is lit at a time. Alternatively, several non-adjacent illuminating devices are lit simultaneously, forming on the contact surface two thin lines of light separated along (OX) by at least 3 mm, preferably between 3 and 10 mm, even between 3 and 5 mm.

Where applicable, a profile is calculated for each pixel of a line of the array optical sensor. A detection of a false print over the entire surface of the array optical sensor is as such carried out.

An image can be directly acquired in which each line of pixels is associated with the same distance D to the thin lighting line.

It is sufficient for this to synchronise the integration frequency of the pixels of the array optical sensor, and the scanning frequency of the lighting of the illuminating devices, in such a way that each integrated line of pixels is lit by a thin lighting line located at this known distance D.

A similar method can be implemented, for an illumination function of the edge type.

Other embodiments can be implemented, for example using lighting, or illuminations, with different wavelengths in such a way as to determine characteristic coefficients of the print for different wavelengths.

Different illumination functions can be used, obtained by lighting at each instant several series of an illuminating device or several adjacent illuminating devices, sufficiently separated from one another in order to be able to independently study several regions of the print.

For example, two lighting strips formed on the contact surface by illuminating devices simultaneously lit and non-adjacent, are separated along (OX) by at least 3 mm, preferably between 3 and 10 mm, even between 3 and 5 mm.

The values of the characteristics coefficients can be determined using both pixels associated with the ridges of the print, and pixels associated with the valleys, and checking that the same conclusion is reached about the print.

The values of the characteristic coefficients can be determined for each one of the pixels of the array optical sensor associated with the ridges of the print (respectively to the valleys of the print), or for different regions of interest on which these values are assumed to be homogeneous.

Then, a global decision can be made, for example with rules on the surface of the largest component detected as fraud. Alternatively, certain portions of the images can be rejected. Another approach consists in returning a map indicating what is assuredly true and what is doubtful in the image.

All of the characteristic coefficients measured at different wavelengths and/or according to several illumination patterns and/or in different regions of interest of the image (ridge pixels and valley pixels for example) can be used as input parameters (predictors) of one of the learning/classification algorithms (Machine Learning or Deep Learning) known to those skilled in the art. For example, a supervised algorithm of the SVM (Support Vector Machine) type with a Gaussian type core will be used. In a first step, a learning is carried out on a database of coefficients measured on true and false fingers.

In a second step, the algorithm, when a new combination of coefficients corresponding to a finger of which the authenticity is not known is submitted to it, returns a score function that corresponds to its probability of belonging to one and the other of the two classes (true and false fingers).

As the learning is carried out on the intrinsic physical characteristics of the materials, and not on the response of a given instrument, it then becomes possible to extrapolate the latter with different sensors with different sensitivities without having to run another learning.

What is claimed is:

1. Method for determining if a papillary print is comprised of living human tissue or not, the print being in direct physical contact with a contact surface (106) of a papillary print sensor (110; 210) comprising, in superposition under the contact surface, an array optical sensor (112; 212) and illuminating means (111; 211) formed by a plurality of illuminating devices (1110; 2110) parallel between them, wherein it comprises the following steps:
    illumination of the papillary print by the illuminating means, with the illuminating devices (1110; 2110; 1110A, 1110B) forming together, on the contact surface (106), at least one light pattern which is uniform along an axis that extends from one side to the other of a detecting surface (125) of the array optical sensor, and acquisition of an image ($I_1$, $I_2$, $I_3$) by the array optical sensor, with these steps being implemented at least once, and at each step of illumination of the papillary print, the illuminating means (111; 211) together form at least one light pattern which is comprised of one or several lighting strips extending from one side to the other of said detecting surface and which is formed by the illuminating devices among which at least one is lit and at least one is extinguished;
    in each image acquired, selection (181) of the pixels corresponding to the valleys of the print, or selection of the pixels corresponding to the ridges of the print; and using the pixels selected, extraction of an optical characteristic defining the response to at least one illumination, of the material comprising the papillary print, and use of this optical characteristic in order to determine the values of at least two characteristic optical coefficients of the print ($\mu_A, \mu_S'$) comprising an absorption coefficient ($\mu_A$) and a reduced scattering coefficient ($\mu_S'$).

2. Method according to claim 1, wherein it further comprises a step of comparison (183) between said values and reference data (161; 661), in order to distinguish values associated with a papillary print comprised of living human tissue, and values associated with a papillary print that is not comprised of living human tissue.

3. Method according to claim 1, wherein each light pattern extends above the detecting surface (125) of the array optical sensor, and is comprised of one or several lighting strips parallel to lines of pixels of the array optical sensor (112; 212).

4. Method according to claim 1, wherein the illumination of the papillary print is implemented using illuminating means (211) arranged above the array optical sensor (212), and such that each illuminating device (2110) is comprised of an organic light-emitting diode.

5. Method according to claim 1, wherein the values of the characteristic optical coefficients of the papillary print ($\mu_A, \mu_S'$) are determined, using a predictive model of the response of a print to a known illumination function, with this model being a function of said characteristic optical coefficients, by minimising a difference between this model and an experimental measurement of the response of the papillary print to this same illumination, obtained using the selected pixels.

6. Method according to claim 5, wherein the predictive model is obtained by a calculation of the convolution of an illumination function associated with the at least one light pattern, with the pulse response of a medium of which the values of said characteristic optical coefficients ($\mu_A, \mu_S'$) are known.

7. Method according to claim 1, wherein at each step of illumination of the papillary print, the illuminating means (111; 211) together form at least one light pattern defined by a periodical illumination function along the axis of the length (L2) of the detecting surface of the array optical sensor.

8. Method according to claim 7, wherein the illuminating means (111; 211) together form a light pattern defined by a spatially periodic illumination function of the slot type.

9. Method according to claim 1, wherein at each step of illumination, the illuminating means (111; 211) together form a light pattern defined by an illumination function of the edge type.

10. Method according to claim 1, wherein at each step of illumination, the illuminating means (111; 211) together form a light pattern defined by an illumination function of the thin line type.

11. Method according to claim 1, wherein at each step of illumination, the illuminating devices (1110; 2110; 1110A, 1110B) are lit and extinguished in order to successively form different light patterns, a scanning frequency from one light pattern to the next being synchronised with a scanning frequency of the integration of the lines of pixels of the array optical sensor (112; 212; 312).

12. Method according to claim 11, wherein the scanning frequency from one light pattern to the next is synchronised with the scanning frequency of the integration of the lines of pixels of the array optical sensor (112; 212; 312), in such a way as to acquire, using the array optical sensor, images in which each line of pixels is associated with the same distance with to particular point of the light patterns.

13. Method according to claim 11, wherein said synchronisation is implemented in order to carry out an illumination of the papillary print by an illumination function of the sine type, and in that the values of said characteristic coefficients of the print ($\mu_A, \mu_S'$) are determined using two images acquired by the array optical sensor, and associated with two separate phase values of said illumination function.

14. System (100) for implementing a method according to claim 1, wherein it comprises:
- the papillary print sensor (110; 210) comprising, in superposition, the contact surface to which the print is intended to be applied, the array optical sensor (112; 212), and the illuminating means (111; 211) formed by a plurality of lights (1110; 2110; 1110A, 1110B) parallel between them; and
- a processor configured to:
- control the lights according to at least one step of illumination of the papillary print;
- receive the at least one image ($I_1, I_2, I_3$) acquired by the array optical sensor, and extract therefrom the pixels corresponding to the valleys of the print, or the pixels corresponding to the ridges of the print; and
- determine values of the characteristic optical coefficients, using the pixels selected.

* * * * *

UNITED STATES PATENT AND TRADEMARK OFFICE
CERTIFICATE OF CORRECTION

PATENT NO.       : 10,810,406 B2
APPLICATION NO.  : 16/064620
DATED            : October 20, 2020
INVENTOR(S)      : Jean-François Mainguet, Jérôme Boutet and Joël Yann Fourre Page 1 of 1

It is certified that error appears in the above-identified patent and that said Letters Patent is hereby corrected as shown below:

On the Title Page (73) Assignee:
"IDEMIA IDENTITY & SCIENCE FRANCE" should be --IDEMIA IDENTITY & SECURITY FRANCE--

Signed and Sealed this
Nineteenth Day of January, 2021

Andrei Iancu
*Director of the United States Patent and Trademark Office*